United States Patent [19]

Georges et al.

[11] Patent Number: 5,155,193
[45] Date of Patent: Oct. 13, 1992

[54] SUSPENSION POLYMERIZATION PROCESSES

[75] Inventors: Michael K. Georges, Guelph; Peter G. Odell, Mississauga; Lupu Alexandru, Toronto, all of Canada

[73] Assignee: Xerox Corporation, Stamford, Conn.

[21] Appl. No.: 548,328

[22] Filed: Jul. 2, 1990

[51] Int. Cl.$^5$ .................. C08F 4/34; C08F 236/10
[52] U.S. Cl. .................. 526/230.5; 526/227; 526/228; 526/232.1; 526/340
[58] Field of Search ............... 526/230.5, 228, 232.1, 526/340, 227

[56] References Cited

U.S. PATENT DOCUMENTS

| | | | |
|---|---|---|---|
| Re. 25,763 | 4/1965 | Marous et al. | 260/92.8 |
| 2,370,588 | 2/1945 | Strain | 260/453 |
| 2,475,648 | 7/1949 | Stoner et al. | 260/94.9 |
| 2,839,519 | 6/1958 | Seed | 260/94.9 |
| 3,326,859 | 6/1967 | Seiner | 260/72 |
| 4,277,592 | 7/1981 | Eichhorn | 526/227 |
| 4,526,726 | 7/1985 | Tang | 260/463 |
| 4,558,108 | 12/1985 | Alexandru et al. | 526/340 |
| 4,613,656 | 9/1986 | Tang | 526/193 |
| 4,777,230 | 10/1988 | Kamath | 526/86 |
| 5,045,611 | 9/1991 | McNeil | 526/340 X |
| 5,089,295 | 2/1992 | McNeil | 526/230.5 X |

FOREIGN PATENT DOCUMENTS

| | | |
|---|---|---|
| 0115704 | 8/1984 | European Pat. Off. . |
| 1104336 | 2/1968 | United Kingdom . |
| 1105134 | 3/1968 | United Kingdom . |

*Primary Examiner*—Fred Teskin
*Attorney, Agent, or Firm*—E. O. Palazzo

[57] ABSTRACT

Process for the preparation of polymers which comprises a suspension free radical polymerization of monomers in the presence of the initiator O,O-t-amyl-O-(2-ethylhexyl)monoperoxycarbonate.

17 Claims, No Drawings

SUSPENSION POLYMERIZATION PROCESSES

BACKGROUND OF THE INVENTION

This invention is generally directed to processes for the preparation of toners, and more specifically the present invention is directed to suspension polymerization processes for the preparation of toners. In one embodiment of the present invention, the process comprises the aqueous phase suspension free radical polymerization for the formation of toner polymer resins, such as styrene butadienes, which process is economical in that, for example, it can be accomplished in a rapid time period as compared to prior art processes as illustrated, for example, in U.S. Pat. No. 4,588,108, the disclosure of which is totally incorporated herein by reference. In one embodiment the process of the present invention can be accomplished in a period of time of from about 4.5 hours to about 5.5 hours and preferably in about 4.8 hours, or about 1 hour less than the processes as illustrated in the prior art, reference for example U.S. Pat. No. 4,588,108. Other advantages associated with the processes of the present invention in embodiments thereof include an initiator that allows, for example, an economical time reduced process, and efficient reduction in residual styrene monomer levels. As a consequence, although the reaction time is reduced, residual monomer levels do not increase in embodiments of the present invention. There is also provided in accordance with the present invention toner compositions comprised of resin particles obtained by the processes illustrated herein, pigment particles, and optional additives such as waxes with hydroxyl functionality, charge enhancing components, metal salts, metal salts of fatty acids, colloidal silicas and the like. In addition, the present invention is directed to developer compositions comprised of the aforementioned toners, and carrier particles. Furthermore, in another embodiment of the present invention there are provided single component toner compositions comprised of resin particles obtained by the processes illustrated herein, magnetic components such as magnetites, and optional additives such as waxes with hydroxyl functionality. The toner and developer compositions of the present invention are useful in electrostatographic imaging and printing systems.

A polymer which has been developed to exhibit properties that can satisfy the stringent standards of advanced copier and duplicators is a copolymer of styrene and butadiene comprised of, for example, a certain ratio of styrene to butadiene moieties, a well certain minimum glass transition temperature and a carefully controlled weigh average molecular weight ($M_w$) range. Emulsion polymerization is a process that can be selected for the preparation of such polymers. However, emulsion polymerization processes have a number of disadvantages including complicated and difficult to control coagulation operations necessary to separate the solid polymer from the latex produced during the emulsion polymerization process. Further, such polymerization processes result in undesirable residual contaminants. In addition, emulsion polymerization techniques can be relatively costly due to the complex processing steps required to form and separate the polymers. Attempts have been made to polymerize copolymers of styrene and butadiene in an aqueous medium to form styrene-butadiene copolymer particles. Examples of these techniques are illustrated in U.S. Pat. Nos. 2,836,584; 4,169,828 and 4,170,699. Unfortunately, these processes have attendant disadvantages when selected for the preparation of toner resins. For example, the process of U.S. Pat. No. 2,836,584 requires polyvinyl alcohol to prevent the formation of a latex, a redox type polymerization initiator or catalyst, and a long chain mercaptan to control the physical properties of the copolymer. Further, materials containing mercaptans emit hydrogen sulfide into the atmosphere and the sulfurous compounds are absorbed by paper substrates during flash fusing due to the decomposition of the mercaptan. The odor of hydrogen sulfide in xerographic copies renders such consumer products unacceptable. The polymerization processes described in U.S. Pat. Nos. 4,169,828 and 4,170,699 require the presence of a bisulfite or persulfate modifier in the presence of adjunct modifier such as amino acids or glutamic acid which adversely affect the electrical properties of electrostatic toners prepared with these materials. The polymerization of at least one polymerizable ethylenic monomer suspended in an aqueous medium often requires the presence of other materials, such as finely divided inorganic particles and other additives. For example, the process disclosed in U.S. Pat. No. 2,673,194 to Grim requires the presence of an anionic surface active agent and the process disclosed in U.S. Pat. No. 2,801,921 to Hutchinson et al. requires the presence of excess alkali and finely divided magnesium hydroxide. Accordingly, there was a need for an improved and more effective aqueous polymerization process for forming a suspension of distinct styrene butadiene copolymer particles which may readily be separated from the reaction medium by mere filtration. There also was a need for a polymerization process which would provide toner polymers possessing properties necessary to meet the demanding requirements of modern high speed electrostatographic imaging systems. These and other needs were provided with the process for the preparation of styrene butadiene copolymers as illustrated in U.S. Pat. No. 4,588,108, the disclosure of which is totally incorporated herein by reference. In one embodiment of the aforementioned patent, there is provided a process for forming discrete particles of a copolymer of styrene and butadiene in which a vapor phase and an aqueous phase comprising a mixture of water, styrene monomer, butadiene monomer, a suspension stabilizing agent, and a chain-propagating amount of a free radical polymerization initiator insoluble in water, soluble in the styrene monomer, soluble in the butadiene monomer and having a 1 hour half life between about 50° C. and about 130° C., the ratio of the styrene monomer and the butadiene monomer being between about 80:20 and about 95:5 by weight, the weight proportion of water to the combination of the styrene monomer and the butadiene monomer being between about 0.8:1 and about 2:1, the suspension stabilizing agent consisting essentially of finely divided, difficulty water soluble powder, is heated in an inert atmosphere to a temperature between about 50° C. and about 130° C. at a pressure between about 20 psi and about 140 psi in the absence of redox initiators and mercaptan compounds, removing butadiene monomer from the vapor phase after at least about 75 percent by weight of the butadiene monomer and styrene monomer in the aqueous phase are converted to a copolymer and prior to conversion of more than about 98 percent by weight of the butadiene monomer and styrene monomer in the aqueous phase to a copolymer and continuing heating in an inert atmosphere at a temperature between about 50° C. and about 130° C. at pressure between about 20 psi and about 140 psi until the Tg value of the discrete copolymer particles formed is between about 45° C. and 65° C. and the weight average molecular weight of the discrete copolymer particles is between about 10,000 and about 400,000. Increased molecular weight distribution of the final copolymer may be achieved by introducing an additional mixture of styrene monomer, butadiene monomer, suspension stabilizing agent and initiator to the aqueous mixture at least once during the heating step. The additional initiator is added in a different proportion relative to the new charge of monomer compared to the origin aqueous mixture. Optimum yields and minimum residual monomer content are achieved by heating the aqueous mixture with at least two different initiators in accordance with predetermined multistage heating procedures. Any suitable styrene monomer for polymerizable styrene monomer derivative may be employed in the polymerization process of the aforementioned patent according to the teachings thereof. Typical polymerizable styrene derivatives disclosed include alpha-methylstyrene, vinyltoluene, ethylstyrene, monochlorostyrene, dichlorostyrene, alkoxystyrenes such as paramethoxystyrene and the like. Styrene is preferred because of its low cost and availability. The other monomeric reactant employed in the process of this the above patent is 1,3-butadiene. Also, according to the teachings of this patent any suitable chain-propagating amount of a free radical polymerization initiator insoluble in water, soluble in the styrene monomer and soluble in the butadiene monomer may be employed in the process of this invention. Typical monomer soluble free radical polymerization initiators include n-lauryl peroxide, benzoyl peroxide, acetyl peroxide, decanoylperoxide, azo-bis-isobutyronitrile t-butyl butylperbenzoate, O,O-t-butyl-O-(ethylhexyl)-monoperoxycarbonate, peroxydicarbonates 2,2-azo-bis(2,4-dimethyl-l-4-methoxyvaleronitrile), 2,2-azo-bis(2,4-dimethylvaleronitrile), and mixtures thereof. Optimum results are achieved with peroxides, peroxycarbonates peroxybenzoates, azonitrile free radical polymerization initiators, and the like. These free radical polymerization initiators should possess a half life of about 1 hour at temperatures between about 50° C. and about 130° C. in order to effect adequate polymerization at reaction temperatures between about 50° C. and about 130° C. for reaction times of less than about 8 hours. Satisfactory results may be achieved when the reaction mixture comprises from about 0.05 percent to about 6.5 percent by weight of the free radical polymerization initiator based on a total weight of the styrene monomer and butadiene monomer. A range of about 0.05 percent to about 6 percent by weight of the free radical polymerization initiator is preferred because it provides an acceptable rate of polymerization and leads to the synthesis of copolymers with molecular properties which enable toners containing these copolymers to melt at low temperatures. Too high a concentration leads to too low a molecular weight. Reaction time is excessive when the concentration of initiator is less than about 0.05 percent. Moreover, the suspension can become unstable and result in polymers having unduly high molecular weight when the initiator concentration is too low.

Disadvantages associated with the process of the aforementioned '188 patent can include long reaction times, for example the reaction time from initiation to completion can be 362 minutes, which includes 45 minutes to heat the reactor to 95° C. from ambient temperature, 192 minutes for the reaction to proceed at 95° C., 40 minutes for the reaction temperature to be increased from 95° C. to 125° C., 60 minutes for the reaction to proceed at 125° C. and 25 minutes for the reactor to be cooled to ambient temperature. These disadvantages can be avoided or minimized with the process of the present invention wherein there is selected as free radical polymerization initiator Lupersol TEAC, O,O-t-amyl-O-(2-ethylhexyl)monoperoxide carbonate. More specifically, with the aforementioned Lupersol available from Lucidol Division of Pennwalt Corporation the reaction time of the process as illustrated in the '188 patent can be reduced at least by one hour in an embodiment of the present invention, thereby enabling, for example, the reaction to be completed in 302 minutes rather than 362 minutes in an embodiment. Also, 33 minutes can be reduced from the part of the reaction where the monomers react at 95° C., and 27 minutes can be reduced from the portion of the reaction where the monomers react at 125° C. in embodiments of the present invention.

Moreover, toner and developer compositions, especially those containing charge enhancing additives, especially additives which impart a positive charge to the toner resin, are well known. Thus, for example, there is described in U.S. Pat. No. 3,893,935 the use of certain quaternary ammonium salts as charge control agents for electrostatic toner compositions. There is also described in U.S. Pat. No. 2,986,521 reversal developer compositions comprised of toner resin particles coated with finely divided colloidal silica. According to the disclosure of this patent, the development of images on negatively charged surfaces is accomplished by applying a developer composition having a positively charged triboelectric relationship with respect to the colloidal silica. Further, there is illustrated in U.S. Pat. No. 4,338,390, the disclosure of which is totally incorporated herein by reference, developer and toner compositions having incorporated therein as charge enhancing additives organic sulfate and sulfonate compositions; and in U.S. Pat. No. 4,298,672, the disclosure of which is totally incorporated herein by reference.

In a patentability search report letter the following U.S. Patents were listed: U.S. Pat. No. 4,558,108 mentioned herein; U.S. Pat. No. 4,777,230 relating to free radical polymerization of certain monomers, and wherein according to the abstract these polymers are produced by a solution polymerization with an initiating amount of tertiary alkyl hydroperoxide or its deriviatives, such as monoperoxycarbonates, see column 2 for example; note column 7 wherein the initiator can be O,O-t-amyl-O-(2-ethylhexyl)monoperoxycarbonate, and in column 8 wherein the initiator can be Luperol ® TAEC, O,O-t-amyl-O-(2-ethylhexyl)-monoperoxycarbonate, marketed by the Lucidol Division of Pennwalt Corporation; column 9, Lupersol ® TAEC, and, for example, columns 13 and 14; U.S. Pat. No. 3,326,859 which discloses a polymerization method with peroxycarbonates, see for example column 2; U.S. Pat. No. 4,277,592, see column 3 wherein as an initiator there is selected bis(2-ethyl-hexyl)percarbonate; U.S. Pat. No. 4,526,726, see column 3, for example; U.S. Pat. No. 4,613,656, see the Abstract of the Disclosure for example; and as background interest U.S. Pat. No.

25,763, U.S. Pat. Nos. 2,370,588; 2,475,648 and 2,839,519.

SUMMARY OF THE INVENTION

It is a feature of the present invention to provide processes for the preparation of polymers.

Another feature of the present invention resides in the provision of processes for the preparation of styrene butadiene copolymers, which processes have many of the advantages illustrated herein.

Further, in another feature of the present invention there are provided economical processes for the preparation of styrene butadiene polymers.

Additionally, in another feature of the present invention there are provided processes for the preparation of styrene butadiene polymers wherein the reaction time is reduced as compared to the prior art process as illustrated, for example, in U.S. Pat. No. 4,588,108.

Moreover, in another feature of the present invention there are provided toner compositions comprised of the polymers obtained with the process of the present invention.

Further, in another object of the present invention there are provided processes for the preparation of styrene/butadiene copolymers that contain small amounts of residual monomers (less than 10 ppm for butadiene and less than 1,400 ppm for styrene) in embodiments of the present invention.

In another feature of the present invention, there are provided processes for the preparation of styrene/butadiene copolymers whose number average molecular weights are between 10,000 and about 400,000 and more specifically about 130,000 such that the toner polymer resin will have sufficient mechanical strength and excellent flow properties (Melt Index numbers between about 18 to about 30 gram/10 minutes when measured at 150° C. with a 2.1 killigrams weight).

These and other features of the present invention are accomplished by providing processes for the preparation of polymers. More specifically, the present invention is directed to a time reduced suspension free radical polymerization process for the preparation of styrene butadiene toner resins. In another embodiment of the present invention, there are provided toner compositions comprised of the resin particles obtained with the processes illustrated herein, pigment particles, and optional additive components.

One specific embodiment of the present invention is directed to an improved process for forming a copolymer of styrene and butadiene in an aqueous phase comprising an aqueous mixture comprising water, styrene monomer, butadiene monomer, a suspension stabilizing agent, and a chain propagating amount of the free radical polymerization initiator benzoyl peroxide, whose 1 hour half life is 91° C. and O,O-t-amyl-O-(2-ethylhexyl-monoperoxycarbonate), available as Lupersol ® TAEC from Lucidol Division of Pennwalt Corporation, whose 1 hour half life is 117° C., which initiators are insoluble in water, soluble in the styrene monomer, soluble in the butadiene monomer, and the ratio of the styrene monomer and the butadiene monomer being between about 80:20 and about 95:5 by weight, the weight proportion of water to the combination of the styrene monomer and the butadiene monomer being between about 0.8:1 and about 2:1, the suspension stabilizing agent being comprised of a finely divided, difficultly water soluble powder and a vapor phase comprised of an inert gas and butadiene monomer, heating the aqueous phase and the vapor phase to a temperature between about 50° C. and about 110° C. at a pressure between about 20 psi and about 140 psi in the absence of redox initiators and mercaptan compounds, removing butadiene monomer from the vapor phase after at least about 75 percent by weight of the butadiene monomer and the styrene monomer in the aqueous phase are converted to a copolymer and prior to conversion of more than about 98 percent by weight of the butadiene monomer and the styrene monomer to a copolymer in the aqueous phase, and heating the aqueous phase at a temperature between about 110° C. and about 130° C. at a pressure between about 20 psi and about 140 psi until at least about 95 percent by weight of the sytrene monomer and the butadiene monomer are copolymerized to form an aqueous suspension of discrete copolymer particles having a Tg value of between about 45° C. and about 65° C., a weight average molecular weight of between about 10,000 and about 400,000, a molecular weight distribution of the copolymer being between about 2 and about 9, and a butadiene monomer concentration of less than about 10 parts per million by weight. With the aforementioned process, the heating of said aqueous phase is usually from about 220 to about 250 minutes and preferably for about 232 minutes, as compared to a preferred reaction time, for the prior art process, as illustrated in the '188 patent, in an embodiment thereof of 292 minutes. Although it is not desired to be limited by theory, it is believed that the shorter reaction times, and other advantages of the processes of the present invention result from the use of the specific Lupersol ® high temperature initiator since, for example, when the reaction is performed under the same conditions with TBEC, O,O-t-butyl-O-(2-ethylhexyl) monoperoxycarbonate, unacceptable high levels of residual styrene monomer can be obtained in embodiments thereof.

In one embodiment of the present invention, the process comprises suspending tricalcium phosphate in a solution of Alkanol in deionized water. The mixture can then be added to a modified Parr pressure reactor containing water. The reactor is sealed and stirring initiated, and continued throughout the course of the reaction. The resulting mixture can then be heated to 95° C. while the reactor is flushed with an inert gas. When the temperature of the reaction mixture has reached 95° C., a solution of butadiene, styrene, benzoyl peroxide and the high temperature TEAC initiator is added, via a sparge tube, under a pressure of nitrogen gas. The reaction can be allowed to proceed for an allotted amount of time, after which the reactor can be vented and the reaction temperature raised to a temperature between 115° C. and 130° C. maintained at that temperature for an allotted amount of time and then cooled to ambient temperature. The product, such as styrene butadiene resulting can then be stirred in an aqueous nitric acid solution, filtered, washed with water and dried.

Various suitable styrene monomers of polymerizable styrene derivatives may be employed in the polymerization process of the present invention. Typical polymerizable styrene derivatives include alphamethylstyrene, vinyltoluene, ethylstyrene, monochlorostyrene, dichlorostyrene, alkoxystyrenes such as paramethoxystyrene and the like. Styrene is preferred primarily because of its low cost and availability. The other monomeric reactant employed in the process of the present invention is 1 3-butadiene. The preferred ratio of the styrene monomer to butadiene monomer reactants is between about 80 to 20 and about 95:5 by weight. Excessively low ratios of styrene monomer tend to cause a decrease of the Tg which will lead to unacceptably low toner resin blocking temperatures and agglomeration of toner particles obtained from such resins. Unduly high ratios of styrene monomer can result in copolymers with high softening temperatures and lead to toners requiring high fixing temperatures and high fixing energy.

Any suitable suspension stabilizing agent may be utilized in the aqueous reaction mixture of this invention. Preferably, the suspension stabilizing agent is a finely divided, difficult water soluble powder, such as tricalcium phosphate, barium phosphate, zinc phosphate magnesium phosphate, bentonite, talc and the like. The amount of suspension stabilizing agent that may be used ranges from about 0.05 percent to about 5.0 percent by weight, based on total weight of the styrene monomer and butadiene monomer. The amount of suspension stabilizing agent of from about 0.05 percent to about 5.0 percent is preferred since it usually assures a stable suspension of copolymer particles. An ionic surfactant may be utilized to disperse the suspension stabilizing agent. Excellent results have been achieved with sodium alkyl naphthalene sulfonate (Alkanol XC, available from E.I. duPont de Nemours & Company) which aids suspension stabilizing agents, such as tricalcium phosphate, to more effectively stabilize the suspension. Other suitable ionic surfactants can be used for this purpose. Typical ionic surfactants include sodium oleate, dodecylbenzene sodium sulfonate, sodium tetradecyl sulfate and the like. The ionic surtactant should be present in an amount between about 0.2 percent and about 4 percent by weight based on the total weight of the suspension stabilizing agent. The amount of water employed in the polymerization process of this invention may be varied but for reasons of heat transfer and monomer and polymer handling, a water to combined styrene monomer and butadiene monomer weight proportion is preferably between about 0.8:1 and about 2:1. When the amount of water is less than about 0.8:1, it can become difficult to avoid agglomeration of the suspended copolymer particles under reaction conditions. When more than a 2:1 ratio is utilized, the low yield of copolymer tends to become commercially unattractive. The reaction should be conducted in an inert atmosphere such as nitrogen, argon and the like.

Morever, the polymerization reaction should be accomplished in an embodiment in a closed system to avoid loss of gaseous butadiene and preferably at a pressure of between about 20 psi and about 140 psi, and more preferably between about 40 psi and about 100 psi to drive the monomers into the reactor against the back pressure of flashed butadiene. Lower pressures would be insufficient to force the monomers into the reactor and higher pressures would require specially designed and expensive reactors. The pressurized polymerization system comprises a vapor phase containing butadiene monomer and an inert gas and an aqueous phase containing water, styrene monomer, butadiene monomer, a suspension stabilizing agent and one or more chain propagating free radical polymerization initiators.

Stirring of the reaction mixture during heating is highly desirable in order to avoid agglomeration of the suspended copolymer particles and to disperse the heat of reaction. Any suitable conventional technique may be utilized. Typical agitation systems include mechanical stirring blades, magnetic mixers, ultrasonic agitators, and the like. It is believed that due to the explosive hazard presented by butadiene, air motors or explosion proof electric motors be utilized for driving mechanical stirrers.

The polymerization temperature will be dependent to some extent upon the half life of the free radical polymerization initiator and the weight ratio of water to monomer utilized. Generally, a temperature between about 50° C. and about 130° C. is satisfactory. Temperatures lower than about 50° C. usually require undesirable long reaction times. Temperatures above about 130° C. affect the macromolecular structure and the molecular properties of the product. The double bonds of styrene monomer in the aqueous phase are converted to a copolymer. During the venting procedure, butadiene monomer removal from the vapor phase should be accomplished as rapidly as possible to limit, as much as possible, loss of butadiene by diffusion out of the polymer particles into the vapor. Though this diffusion is a relatively slow process and thus speed is not particularly critical, except for overall reactor productivity, removal of butadiene should be carried out after the bulk of the polymerization has occurred so as to not waste butadiene or adversely affect the properties of the polymer. Under typical operating conditions, this is about 2.0 to 3 hours into the reaction. This provides sufficient time for the butadiene still dissolved in the polymer to react (for example, about 30 to 45 minutes at a high temperature of, for example, about 125° C.). While the butadiene can be removed at any temperature, it is more convenient to do so below the boiling point of water. Thus, for example, the butadiene vapor is typically vented at about between 90° to 95° C. before raising the reactor temperature to about 125° C. Removal of the butadiene vapor from the vapor phase may be effected by any suitable technique. For example, the butadiene vapor may be removed by venting, continuous flushing with an inert gas, recycling the reactor vapor space through an appropriate butadiene scrubber, and the like. Venting is preferred because it is simple, rapid, inexpensive and efficient. When venting is employed to removing butadiene monomer from the vapor phase, the venting step should be repeated at least twice to ensure adequate removal of butadiene monomer vapor. A venting procedure involves the following steps. A valve is opened and the pressure in the vapor phase region of the reactor is released at a rate convenient for the reactor and piping size. Following depressurization, the valve is closed and the reactor repressurized with an inert gas. This pressure resulting from repressurization is then released and the process may then be repeated. The butadiene vapor is, in effect, diluted out by repeated purges of inert gas. The reactor pressure need not be reduced to atmospheric pressure so long as the venting process eventually removes substantially all the butadiene monomer vapor from the vapor phase in the reactor. Reduction of the reactor pressure to atmospheric pressure should be avoided when the reactor is at a temperature above 100° C. to avoid excessive loss of water. Preferably, sufficient butadiene monomer vapor is removed from the vapor phase in the reaction system to reduce the butadiene monomer vapor concentration in the vapor phase from about 11 percent by volume to less than about 0.05 percent by volume. This ensures satisfactory achievement of a butadiene monomer concentration in the copolymer particles of less than about 10 parts per million by weight during the polymerization reaction. Preferably, the butadiene monomer concentration in the copolymer particles are reduced to less than about 1 part per million by weight. A low concentration of butadiene monomer in the copolymer particle product is especially desirable to minimize adverse effect on blocking and electrical properties of electrostatographic toners and to obviate health and odor concerns.

It has also been found in process embodiments of the present invention that significant reduction of the residual styrene monomer in the final reaction product may be achieved by heating the aqueous mixture in accordance with a predetermined heating profile involving heating the aqueous mixture to a first temperature between about 50° C. and less than about 100° C., maintaining the first temperature until substantial thermolitic dissociation of at least one free radical polymerization initiator occurs and thereafter raising the temperature of the aqueous reaction mixture to at least a second temperature greater than about 90° C. and less than about 130° C. and maintaining the second temperature for a sufficient period of time to achieve substantial thermolitic dissociation of a second free radical polymerization initiator. By substantial thermolitic dissociation, it is meant that at least about 50 percent based on the initial charge of the free radical polymerization initiator actually dissociates.

A significant reduction of the residual butadiene monomer in the final reaction product may be achieved by removing substantially all the butadiene monomer still present in the vapor phase after at least about 75 percent by weight of the butadiene monomer and styrene monomer in the aqueous phase are converted to a copolymer and prior to morethan about 98 percent by weight of the butadiene monomer and styrene monomer in the aqueous phase are converted to a copolymer thereby allowing the butadiene monomer present in the copolymer particles suspended in the aqueous phase to copolymerize with the styrene coreactant. In suspension polymerization systems, the butadiene is partitioned between the polymizable particles and the vapor phase. It is believed that a dynamic pressure equilibrium controls the partition. As butadiene in the particles copolymerizes with styrene, fresh quantities of butadiene from the vapor phase enter the particles. The pressure in the suspension polymerization system decreases and polymerization conversion is monitored by continuous or periodic recording. Since the pressure in the suspension polymerization system continues to decrease to the end of the polymerization and since butadiene is still found in the final vent, it is believed that fresh butadiene from the vapor phase continues to penetrate into the particles to the end of the polymerization process. Therefore, that part of the butadiene which penetrates the particles only in the final stage of the reaction is not alloted sufficient time to polymerize and remains trapped as a residue in the resin. This appears to be the source of the residual butadiene in the final copolymer resin product. Thus, removal of substantially all the butadiene monomer vapor still present in the vapor phase after the copolymer particles form, but prior to termination of the polymerization process allows the butadiene monomer present in the copolymer particles in the aqueous phase to copolymerize with the styrene coreactant.

The butadiene vapor can be removed from the vapor phase after at least about 75 percent by weight of the butadiene monomer and styrene monomer in the aqueous phase are converted to a copolymer and prior to more than about 98 percent by weight of the butadiene monomer and styrene monomer in the aqueous phase are converted to a copolymer to allow the butadiene monomer present in the aqueous phase to copolymerize with the styrene coreactant after removal of the butadiene monomer from the vapor phase and prior to termination of the reaction. Preferably, the butadiene monomer is removed from the vapor phase after at least about 85 percent by weight of the butadiene monomer and styrene monomer in the aqueous phase are converted to a copolymer and prior to more than about 95 percent by weight of the butadiene monomer and polymers and the primary initiator level can indirectly affect the residual monomer level. The prudent choice of initiator levels and temperature profile controls the final molecular properties. A styrene and butadiene copolymer weight average molecular weight between about 10,000 and about 400,000 can be selected for ideal toner resin properties in high speed electrostatographic copiers and duplicators.

Suitable profiles for the multistage heating profile embodiment of this invention may be determined by considering the half life characteristics of the initiators. The lower temperature region should be sufficiently long to polymerize the bulk of the monomer both for energy efficiency and suspension stability. The time for the upper temperature reaction is chosen to be as short as possible while achieving the desired reduction in residual monomer content of the final product and controlling the final $M_w$. Thus, the desired temperature profile may be readily determined by conducting time-temperature reactions and measurement of the polymer properties. Another variable is the length of time spent moving from one temperature to another (the ramp) and this is generally kept as short as possible for the reactor system with a time allowance for the remaining first stage initiator to decompose in a nonexplosive fashion.

The multistage heating profile embodiment of this invention has been found to be capable of reducing the residual styrene monomer in the final resin product to as low as about 0.05 percent by weight based on the total weight of the copolymer product and the residual butadiene monomer content to as low as about 17 ppm by weight based on the total weight of the copolymer product. Residual monomer content in the final copolymer product should be minimized to avoid a reduction of the blocking temperature and undesirable environmental effects produced when the resin is subjected to fusing conditions in electrostatographic copiers and duplicators. Generally, for multistage heating profiles, it is desirable that between about 70 percent and about 95 percent by weight of the total monomer mixture be polymerized in the first heating stage to about the molecular weight desired and thereafter heated to one or more subsequent stages to polymerize the residual monomer remaining in the composition. The multistage heating profile permits the use of smaller amounts of active free radical polymerization initiators in the one or more heating stages following the first heating stage. It is believed that the one or more subsequent heating stages promotes more effective diffusion of the initiator to the monomers for more complete polymerization. It is further believed that O,O-t-amyl-O-(2-ethylhexyl) monoperoxycarbonate is more efficient at polymerizing residual monomer than O,O-t-butyl-O-(2-ethylhexyl) monoperoxycarbonate. The multistage heating profile embodiment also provides optimum molecular weight distribution. Molecular weight distribution (MWD) is defined as the ratio between the weight average molecular weight ($M_w$) and the number average molecular weight ($M_n$).

In addition, in accordance with embodiments of the present invention there are provided toner and developer compositions comprised of toner compositions containing resin particles, particularly styrene butadiene resins obtained with the process illustrated herein, pigment particles such as magnetites, carbon blacks or mixtures thereof, optional polymeric hydroxy waxes available from Petrolite as detailed hereinafter, which waxes can be incorporated into the toner compositions as internal additives or may be present as external components; and optional charge enhancing additives, particularly for example distearyl dimethyl ammonium methyl sulfate, reference U.S. Pat. No. 4,560,635, the disclosure of which is totally incorporated herein by reference, and carrier particles. As preferred carrier components for the aforementioned compositions, there are selected steel or ferrite materials, particularly with a polymeric coating thereover including the coatings as illustrated in U.S. Ser. No. 751,922 (now abandoned), entitled Developer Composition with Specific Carrier Particles, the disclosure of which is totally incorporated herein by reference. One particularly preferred coating illustrated in the aforementioned application is comprised of a copolymer of vinyl chloride and trifluorochlorethylene with conductive substances dispersed in the polymeric coating inclusive of, for example, carbon black. One embodiment disclosed in the aforementioned copending application is a developer composition comprised of styrene butadiene copolymer resin particles, and charge enhancing additives selected from the group consisting of alkyl pyridinium halides, ammonium sulfates, and organic sulfate or sulfonate compositions; and carrier particles comprised of a core with a coating of vinyl copolymers, or vinyl homopolymers.

Numerous well known suitable pigments can be selected as the colorant for the toner particles including, for example, carbon black, nigrosine dye, aniline blue, phthalocyanine derivatives, magnetites and mixtures thereof. The pigment, which is preferably carbon black, should be present in a sufficient amount to render the toner composition colored thereby permitting the formation of a clearly visible image. Generally, the pigment particles are present in amounts of from about 3 percent by weight to about 20 percent by weight, based on the total weight of the toner composition, however, lesser or greater amounts of pigment particles can be selected providing the objectives of the present invention are achieved.

When the pigment particles are comprised of magnetites, including those commercially available as Mapico Black ®, they are present in the toner composition in an amount of from about 10 percent by weight to about 70 percent by weight, and preferably in an amount of from about 10 percent by weight to about 30 percent by weight. Alternatively, there can be selected as pigment particles mixtures of carbon black or equivalent pigments and magnetites, which mixtures, for example, contain from about 6 percent to about 70 percent by weight of magnetite, and from about 2 percent to about 15 percent by weight of carbon black. Particularly preferred as pigments are magnetites as they enable, for example, excellent images for extended time periods exceeding the development of 100,000 images, which corresponds to about 400,000 imaging cycles for a panel containing four imaging members.

Also embraced within the scope of the present invention are colored toner compositions containing as pigments or colorants magenta, cyan, and/or yellow particles, as well as mixtures thereof. More specifically, with regard to the generation of color images utilizing the toner and developer compositions of the present invention, illustrative examples of magenta materials that may be selected include, for example, 2,9-dimethylsubstituted quinacridone and anthraquinone dye identified in the Color Index as CI 60710, CI Dispersed Red 15, a diazo dye identified in the Color Index as CI 26050, CI Solvent Red 10, Lithol Scarlett, Hostaperm, and the like. Illustrative examples of cyan materials that may be used as pigments include copper tetra-4(octadecyl sulfonamido) phthalocyanine, X-copper phthalocyanine pigment listed in the Color Index as CI 74160, CI Pigment Blue, and Anthrathrene Blue, identified in the Color Index as CI 69810, Special Blue X-2137, Sudan Blue, and the like; while illustrative examples of yellow pigments that may be selected include diarylide yellow 3,3-dichlorobenzidene acetoacetanilides, a monazo pigment identified in the Color Index as CI 12700, CI Solvent Yellow 16, a nitrophenyl amine sulfonamide identified in the Color Index as Foron Yellow SE/GLN, CI Dispersed Yellow 33, 2,5-dimethoxy-4-sulfonanilide phenylazo-4'-chloro-2,5-dimethoxy acetoacetanilide, Permanent Yellow FGL, and the like. These pigments are generally present in the toner composition in an amount of from about 2 weight percent to about 15 weight percent based on the weight of the toner resin particles.

Illustrative examples of optional charge enhancing additives present in various effective amounts, such as for example from about 0.1 to about 20 percent by weight, include alkyl pyridinium halides, such as cetyl pyridinium chlorides, reference U.S. Pat. No. 4,298,672, the disclosure of which is totally incorporated herein by reference, cetyl pyridinium tetrafluoroborates, quaternary ammonium sulfate, and sulfonate charge control agents as illustrated in U.S. Pat. No. 4,338,390, the disclosure of which is totally incorporated herein by reference; stearyl phenethyl dimethyl ammonium tosylates, reference U.S. Pat. No. 4,338,390, the disclosure of which is totally incorporated herein by reference; distearyl dimethyl ammonium methyl sulfate, reference U.S. Pat. No. 4,560,635, the disclosure of which is totally incorporated herein by reference; stearyl dimethyl hydrogen ammonium tosylate; and other known similar charge enhancing additives and the like.

With further respect to the toner and developer compositions of the present invention, a further component that can be present therein is a linear polymeric alcohol comprised of a fully saturated hydrocarbon backbone with at least about 80 percent of the polymeric chains terminated at one chain end with a hydroxyl group, which alcohol is represented by the following formula:

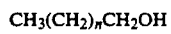

$$CH_3(CH_2)_nCH_2OH$$

wherein n is a number of from about 30 to about 300, and preferably of from about 30 to about 100, which alcohols are available from Petrolite Corporation. Particularly preferred polymeric alcohols include those wherein n represents a number of from about 30 to about 50. Therefore, in an embodiment of the present invention the polymeric alcohols selected have a number average molecular weight as determined by gas chromatography of from about greater than 450 to about 1,400, and preferably of from about 475 to about 750. In addition, the aforementioned polymeric alcohols can be present in the toner and developer compositions illustrated herein in various effective amounts, and can be added as uniformly dispersed internal, or as finely divided uniformly dispersed external additives. More specifically, the polymeric alcohols are present in an amount of from about 0.05 percent to about 20 percent by weight. Therefore, for example, as internal additives the polymeric alcohols can be present in an amount of from about 0.5 percent by weight to about 20 percent by weight, while as external additives the polymeric alcohols can be present in an amount of from about 0.05 percent by weight to slightly less than about 5 percent by weight. Toner and developer compositions with the waxes present internally are formulated by initially blending the toner resin particles, pigment particles, and polymeric alcohols, and other optional components. In contrast, when the polymeric alcohols are present as external additives, the toner composition is initially formulated comprised of, for example, resin particles and pigment particles; and subsequently there is added there to finely divided polymeric alcohols.

Illustrative examples of carrier particles that can be selected for mixing with the toner compositions of the present invention include those particles that are capable of triboelectrically obtaining a charge of opposite polarity to that of the toner particles. Accordingly, the carrier particles of the present invention can be selected so as to be of a negative polarity thereby enabling the toner particles which are positively charged to adhere to and surround the carrier particles. Alternatively, there can be selected carrier particles with a positive polarity enabling toner compositions with a negative polarity. Illustrative examples of carrier particles that may be selected include granular zircon, granular silicon, glass, steel, nickel, iron, ferrites, silicon dioxide, and the like. Additionally, there can be selected as carrier particles nickel berry carriers as disclosed in U.S. Pat. No. 3,847,604, which carriers are comprised of nodular carrier beads of nickel characterized by surfaces of reoccurring recesses and protrusions thereby providing particles with a relatively large external area. Preferred carrier particles selected for the present invention are comprised of a magnetic, such as steel, core with a polymeric coating thereover several of which are illustrated, for example, in U.S. Ser. No. 751,922 (now abandoned) relating to developer compositions with certain carrier particles, the disclosure of which is totally incorporated herein by reference. More specifically, there are illustrated in the aforementioned application carrier particles comprised of a core with a coating thereover of vinyl polymers or vinyl homopolymers. Examples of specific carriers illustrated in this abandoned application, and particularly useful for the present invention are those comprised of a steel or ferrite core with a coating thereover of a vinyl chloride/-trifluorochloroethylene copolymer, which coating contains therein conductive particles, such as carbon black. Other coatings include fluoropolymers, such as polyvinylidenefluoride resins, poly(chlorotrifluoroethylene), fluorinated ethylene and propylene copolymers, terpolymers of styrene, methylmethacrylate, and a silane, such as triethoxy silane, reference U.S. Pat. Nos. 3,467,634 and 3,526,533, the disclosures of which are totally incorporated herein by reference; polytetrafluoroethylene, fluorine containing polyacrylates, and polymethacrylates; copolymers of vinyl chloride; and trichlorofluoroethylene; and other known coatings. There can also be selected as carriers components comprised of a core with a polymer mixture coating thereover, reference U.S. Pat. Nos. 4,937,166 and 4,935,326, the disclosures of which are totally incorporated herein by reference. More specifically, there is detailed in these applications a process for the preparation of carrier particles with substantially stable conductivity parameters which comprises (1) mixing carrier cores with a polymer mixture comprising from about 10 to about 90 percent by weight of a first polymer, and from about 90 to about 10 percent by weight of a second polymer; (2) dry mixing the carrier core particles and the polymer mixture for a sufficient period of time enabling the polymer mixture to adhere to the carrier core particles; (3) heating the mixture of carrier core particles and polymer mixture to a temperature of between about 200° F. and about 550° F. whereby the polymer mixture melts and fuses to the carrier core particles; and (4) thereafter cooling the resulting coated carrier particles.

Also, while the diameter of the carrier particles can vary, generally they are of a diameter of from about 50 microns to about 1,000 microns, thus allowing these particles to possess sufficient density and inertia to avoid adherence to the electrostatic images during the development process. The carrie particles can be mixed with the toner particles in various suitable combinations, however, from about 1 to about 5 parts per toner to about 10 parts to about 200 parts by weight of carrier can be mixed.

The toner compositions of the present invention can be prepared by a number of known methods, including mechanical blending and melt blending the toner resin particles, pigment particles or colorants, and polymeric alcohols followed by mechanical attrition. Other methods include those well known in the art, such as spray drying, mechanical dispersion, melt dispersion, dispersion polymerization, and suspension polymerization. In one dispersion polymerization method, a solvent dispersion of the resin particles, the pigment particles, polymeric alcohols, and charge enhancing additive are spray dried under controlled conditions to result in the desired product. With further respect to the present invention, the polymeric alcohols are preferably added as external additives, that is the toner compositions are first prepared, which compositions are comprised of, for example, resin particles and pigment particles; and subsequently there is added thereto the polymeric alcohol, preferably in a finely divided form wax. Alternatively, however, as indicated herein the wax may be incorporated as an internal additive by formulating the toner composition with a process that comprises the mixing and melt blending of resin particles, pigment particles, and wax. The toner particles obtained can be subjected to known micronization and classification to enable toners with an average particle diameter of from about 10 to about 30, and preferably from about 10 to about 20 microns.

The toner and developer compositions of the present invention may be selected for use in developing images in electrostatographic imaging systems, containing therein, for example, conventional photoreceptors, such as selenium and selenium alloys. Also useful, especially wherein there is selected positively charged toner compositions, are layered photoresponsive devices comprised of transport layers and photogenerating layers, reference U.S. Pat. Nos. 4,265,990; 4,585,884; 4,584,253 and 4,563,408, the disclosures of which are totally incorporated herein by reference, and other similar layered photoresponsive devices. Examples of photogenerating layers include selenium, selenium alloys, trigonal selenium, metal phthalocyanines, metal free phthalocyanines and vanadyl phthalocyanines, while examples of charge transport layers include the aryl amines as disclosed in U.S. Pat. No. 4,265,990. Moreover, there can be selected as photoconductors hydrogenated amorphous silicon; and as photogenerating pigments squaraines, perylenes; and the like.

Moreover, the toner and developer compositions of the present invention are particularly useful with electrostatographic imaging apparatuses containing a development zone situated between a charge transporting means and a metering charging means, which apparatus is illustrated in U.S. Pat. Nos. 4,394,429 and 4,368,970, the disclosures of which are totally incorporated herein by reference. More specifically, there is illustrated in the aforementioned '429 patent a self-agitated, two-component, insulative development process and apparatus wherein toner is made continuously available immediately adjacent to a flexible deflected imaging surface, and toner particles transfer from one layer of carrier particles to another layer of carrier particles in a development zone. In one embodiment, this is accomplished by bringing a transporting member, such as a development roller, and a tensioned deflected flexible imaging member into close proximity, that is a distance of from about 0.05 millimeter to about 1.5 millimeters, and preferably from about 0.4 millimeter to about 1.0 millimeter in the present of a high electric field, and causing such members to move at relative speeds. There is illustrated in the aforementioned '970 patent an electrostatographic imaging apparatus comprised of an imaging means, a charging means, an exposure means, a development means, and a fixing means, the improvement residing in the development means comprising in operative relationship a tensioned deflected flexible imaging means; a transporting means; a development zone situated between the imaging means and the transporting means; the development zone containing therein electrically insulating magnetic carrier particles, means for causing the flexible imaging means to move at a speed of from about 5 centimeters/second to about 50 centimeters/second, means for causing the transporting means to move at a speed of from about 6 centimeters/second to about 100 centimeters/second, the means for imaging and the means for transporting moving at different speeds; and the means for imaging and the means for transporting having a distance therebetween of from about 0.05 millimeter to about 1.5 millimeters.

A preferred developer composition of the present invention in an embodiment thereof is comprised of a toner composition with styrene butadiene resin particles (91/9), about 16 percent by weight of magnetite, about 3 percent by weight of carbon black, about 1.0 percent by weight of the charge enhancing additive distearyl dimethyl ammonium methyl sulfate, and as an external additive about 0.30 percent by weight of the polymeric alcohol illustrated herein with a number average molecular weight of about 700, and carrier particles comprised of a steel core with a coating thereover of a polymer of, for example, a vinyl chloride/trifluorochloroethylene copolymer available as FPC 461, which coating has dispersed therein carbon black particles.

The following examples are being submitted to further define various species of the present invention. These examples are intended to illustrate and not limit the scope of the present invention. Also, parts and percentages are by weight unless otherwise indicated.

EXAMPLE I

Suspension Free Radical Polymerization of Styrene and Butadiene(89/11) with TAEC as the High Temperature Finishing Initiator

| Reagents: | |
|---|---|
| Styrene | 71.3 grams |
| 1,3-Butadiene | 10.7 grams |
| Alkanol | 48 milligrams |
| TCP | 4.0 grams |
| BPO | 2.20 grams |
| TAEC | 0.27 milliliters |
| H$_2$O | 100 milliliters |

Tricalcium phosphate (4.0 grams) was suspended in a solution of Alkanol (48 milligrams) in deionized water (40 milliliters). The mixture was added to a modified Parr pressure reactor containing 60 milliliters of deionized water. The reactor was sealed and the contents were stirred at approximately 500 rpm while being heated to 95° C. over a period of 40 minutes. During this time, the reactor was flushed with nitrogen gas. At the end of the forty minutes, a solution of styrene (71.3 grams), 1,3-butadiene (10.7 grams), benzoyl peroxide (2.20 grams) and TAEC, O,O-amyl-O-(2-ethyl hexyl)-monoperoxide carbonate, (0.27 milliliters) was added to the reactor, via a sparge tube, under a pressure of nitrogen gas, over a period of 14 to 16 minutes. The final reactor pressure was usually between 65 and 70 psi. The reaction was allowed to proceed at 95° C. for 159 minutes. Fifteen minutes before the end of the 95° C. ramp, the reactor was vented 5 times, over a period of 20 minutes, to remove unreacted 1,3-butadiene. The reaction mixture was allowed to heat up to 125° C., over 40 minutes, maintained at 125° C. for 33 minutes and then cooled. The product was stirred in the presence of nitric acid (8 milliliters) for 10 minutes, filtered, washed twice with 300 milliliters deionized water and dried under vacuum overnight at 40° C. The yield of product was 98 percent. The copolymer styrene butadiene product was characterized by Tg, MI and GPC. Residual impurities were determined by GPC. Tg=58° C.; MI=24.1 gm/10 minutes; M$_n$=15.5K; M$_w$=134.4K; residual styrene=1,146 ppm and residual butadiene=1.8 ppm.

EXAMPLE II

Reaction With TAEC as the High Temperature Initiator

The reaction of Example I was repeated. The amount of benzoyl peroxide was changed from 2.20 grams to 2.17 grams to affect an increase in molecular weight of the product.

The styrene/butadiene resin was isolated in 98 percent yield. The Tg=59° C.; MI=23.0 grams/10 minutes; M$_n$=15.9K; M$_w$=139.3K; residual styrene=1,530 ppm and residual butadiene=8.7 ppm.

EXAMPLE III

Reaction With TBEC as the High Temperature Initiator

Tricalcium phosphate (6.0 grams) was suspended in a solution of Alkanol (48 milligrams) in deionized water (40 milliliters). The mixture was added to a modified Parr pressure reactor containing 60 milliliters of deionized water. The reactor was sealed and the contents were stirred at approximately 500 rpm while being heated to 95° C. over a period of 40 minutes. During this time, the reactor was flushed with nitrogen gas. At the end of the 40 minutes, a solution of styrene (71.3 grams), 1,3-butadiene (10.7 grams), benzoyl peroxide (2.20 grams) and TBEC (0.27 milliliter) was added to the reactor, via a sparge tube, under a pressure of nitrogen gas, over a period of 14 to 16 minutes. The final reactor pressure was usually between 65 and 70 psi. The reaction was allowed to proceed at 95° C. for 162 minutes. Fifteen minutes before the end of the 95° C. ramp, the reactor was vented 5 times, over a period of 20 minutes, to remove unreacted 1,3-butadiene. The reaction mixture was allowed to heat up to 125° C. over 40 minutes, maintained at 125° C. for 35 minutes and then cooled. The styrene butadiene copolymer product was stirred in the presence of nitric acid (8 milliliters) for 10 minutes, filtered, washed twice with 300 milliliters deionized water and dried under vacuum overnight at 40° C. The yield of product was 97 percent. The copolymer product was characterized by Tg and GPC. Residual impurities were determined by GPC. Tg=56° C.; residual styrene=2,091 ppm.

EXAMPLE IV

Reaction With TAEC as the High Temperature Initiator

When the reaction of Example III was repeated with the sole change of replacing TBEC with TAEC, a styrene/butadiene resin was obtained with a Tg of 57° C. and a residual styrene monomer level of 1,117 ppm, a reduction of about 50 percent of the residual styrene monomer amount.

Other modifications of the present invention may occur to those skilled in the art subsequent to a review of the present application. The aforementioned modifications, including equivalents thereof are intended to be included within the scope of the present invention.

What is claimed is:

1. Processes for the preparation of polymers which comprises a suspension free radical polymerization of monomers in the presence of the initiator O,O-t-amyl-O-(2-ethylhexyl)monoperoxycarbonate.

2. Processes for the preparation of styrene butadiene polymers which comprises a suspension free radical polymerization of styrene and butadiene monomers in the presence of initiators, one of which is O,O-t-amyl-O-(2-ethylhexyl)monoperoxycarbonate.

3. A process for generating a copolymer of styrene and butadiene comprising providing an aqueous phase comprising an aqueous mixture comprising water, styrene monomer, butadiene monomer, a suspension stabilizing agent, and a O,O-t-amyl-O-(2-ethylhexyl)-monoperoxycarbonate chain propagating free radical polymerization initiator insoluble in water, soluble in said styrene monomer, soluble in said butadiene monomer with a 1 hour half life between about 50° C. and about 110° C., the ratio of said styrene monomer and said butadiene monomer being between about 80:20 and about 95:5 by weight, the weight proportion of water to the combination of said styrene monomer and said butadiene monomer is between about 0.8:1 and about 2:1, said suspension stabilizing agent being comprised of a finely-divided, difficulty water-soluble powder and a vapor phase comprising an inert gas and butadiene monomer, heating said aqueous phase and said vapor phase to a temperature between about 50° C. and about 130° C. at a pressure between about 20 psi and about 140 psi in the absence of redox initiators and mercaptan compounds, removing butadiene monomer from said vapor phase after at least about 75 percent by weight of said butadiene monomer and said styrene monomer in said aqueous phase are converted to a copolymer and prior to conversion of more than about 98 percent by weight of said butadiene monomer and said styrene monomer to a copolymer in said aqueous phase, and heating said aqueous phase at a temperature between about 100° C. and about 130° C. at a pressure between about 20 psi and about 140 psi until at least about 90 percent by weight of said styrene monomer and said butadiene monomer are copolymerized to form an aqueous suspension of discrete copolymer particles having a Tg value of between about 45° C. and about 65° C., a weight average molecular weight of between about 10,000 and about 400,000, a molecular weight distribution of said copolymer between about 2 and about 9 and a butadiene monomer concentration of less than about 10 parts per million by weight.

4. A process in accordance with claim 3 wherein the monomers are reacted for a period of from about 3.5 and about 5.5 hours.

5. A process in accordance with claim 3 wherein said aqueous mixture is heated to an initial temperature of less than about 100° C.

6. A process in accordance with claim 3 wherein said aqueous mixture is heated for less than about 60 hours.

7. A process in accordance with claim 3 wherein a second initiator is utilized.

8. A process according to claim 7 wherein the second initiator is benzoyl peroxide.

9. A process in accordance with claim 7 wherein said aqueous mixture comprises from about 0.05 percent to about 6.5 percent by weight of said second free radical polymerization initiator based on the total weight of said styrene monomer and said butadiene monomer, the first said initiator O,O-t-amyl-O-(2-ethylhexyl)-monoperoxycarbonate having a one hour half life at a temperature between about 50° C. and about 110° C., and the second said initiator having a 1 hour half life at a temperature between about 100° C. and about 130° C.

10. A process in accordance with claim 3 wherein said aqueous mixture comprises from about 0.5 percent to about 6.0 percent by weight of said suspension stabilizing agent based on the total weight of said styrene monomer and said butadiene monomer.

11. A process in accordance with claim 10 wherein the aqueous mixture is agitated while heating.

12. A process in accordance with claim 3 wherein there is removed sufficient butadiene monomer from said vapor phase to reduce the butadiene monomer in said vapor phase to less than about 0.05 percent by volume.

13. A process in accordance with claim 3 wherein there is removed said butadiene monomer from said vapor phase by venting.

14. A process in accordance with claim 3 wherein there is removed said butadiene monomer from said vapor phase by increasing the pressure and venting.

15. A process in accordance with claim 3 wherein the aqueous mixture is heated in ccordance with a predetermined heating profile comprising heating said aqueous mixture to a first temperature between about 50° C. and less than about 100° C., maintaining said first temperature in accordance with said predetermined heating profile, heating said aqueous mixture to a second temperature at least about 15° C. greater than said first temperature and greater than about 100° C. and less than about 130° C. in accordance with said predetermined heating profile and maintaining said second temperature in accordance with said predetermined heating profile.

16. A process in accordance with claim 3 wherein the initiator O,O-t-amyl-O-(2-ethylhexyl)monoperoxycarbonate is present in an amount of from about 0.12 percent to about 0.60 percent by weight relative to the weight of the monomers styrene and 1,3-butadiene.

17. A process according to claim 3 wherein the reactor is flushed with an inert gas to remove oxygen.

* * * * *